(12) United States Patent
Blank et al.

(10) Patent No.: US 7,335,437 B2
(45) Date of Patent: Feb. 26, 2008

(54) FUEL CELL STACK

(75) Inventors: Felix Blank, Constance (DE); Cosmas Heller, Friedrichshafen (DE); Ottmar Schmid, Markdorf (DE)

(73) Assignee: DaimlerChrysler AG, Stuttgart (DE)

( * ) Notice: Subject to any disclaimer, the term of this patent is extended or adjusted under 35 U.S.C. 154(b) by 470 days.

(21) Appl. No.: 10/415,786

(22) PCT Filed: Nov. 6, 2001

(86) PCT No.: PCT/DE01/04158

§ 371 (c)(1),
(2), (4) Date: Sep. 15, 2003

(87) PCT Pub. No.: WO02/39529

PCT Pub. Date: May 16, 2002

(65) Prior Publication Data

US 2004/0053105 A1   Mar. 18, 2004

(30) Foreign Application Priority Data

Nov. 8, 2000   (DE) .................... 100 55 253

(51) Int. Cl.
*H01M 8/02* (2006.01)
(52) U.S. Cl. .......................... 429/38; 429/34
(58) Field of Classification Search .......... 429/32, 429/34, 38
See application file for complete search history.

(56) References Cited

U.S. PATENT DOCUMENTS

| | | | | |
|---|---|---|---|---|
| 4,515,871 A | * | 5/1985 | Shirogami et al. | 429/34 |
| 4,631,239 A | * | 12/1986 | Spurrier et al. | 429/39 |
| 4,769,297 A | | 9/1988 | Reiser et al. | 429/17 |
| 4,973,530 A | | 11/1990 | Vanderborgh et al. | 429/13 |
| 6,007,933 A | * | 12/1999 | Jones | 429/38 |
| 6,541,145 B2 | * | 4/2003 | Wilkinson et al. | 429/34 |

FOREIGN PATENT DOCUMENTS

| | | |
|---|---|---|
| DE | 197 43 067 | 4/1999 |
| JP | 5159790 | 6/1993 |
| JP | 200090947 | 3/2000 |

OTHER PUBLICATIONS

Certified Translation of DE 19743067 A1.*

* cited by examiner

*Primary Examiner*—Gregg Cantelmo
(74) *Attorney, Agent, or Firm*—Davidson, Davidson & Kappel, LLC

(57) ABSTRACT

A fuel cell stack for gaseous fuel includes a membrane electrode unit and a distribution plate including a channel area having gas channels for distributing the anode gas and the cathode gas to the membrane electrode unit and a port area for supplying the anode gas and the cathode gas into the channel area. Additional connecting channels discharge from the port areas along the gas channels so that unused anode gas or cathode gas is locally meterable from the port areas into the gas channels via these connecting channels.

1 Claim, 2 Drawing Sheets

FUEL CELL STACK

BACKGROUND

The present invention relates to a fuel cell stack according to the definition of the species in claim 1.

Fuel cell stacks according to the related art include at least one, however, typically a plurality, of individual fuel cells which are stacked either side by side or one upon the other. An individual cell includes two distribution plates for the distribution of the fluids and a membrane electrode unit, also abbreviated referred to as MEA (membrane electrode assembly), situated between them. A MEA includes an anode, a cathode, and a proton-conductive electrolyte membrane situated between them. By using the proton-conductive electrolyte membrane (PEM), proton conveyance from the anode to the cathode is ensured. On the anode side and the cathode side, the distribution plates have gas channels (anode and cathode channels) for the supply and the removal of the fuel-containing anode gas, e.g., hydrogen, and the oxygen-containing cathode gas, e.g., air.

In an electrochemical reaction, water is obtained as a product at the cathode. Indeed, the MEA is heavily dehumidified, in particular at the entry of the cathode gas into the cathode channel. This dehumidifying is caused by the water vaporization due to the high temperatures which occur in the electrochemical reaction and during current conveyance. This effect is reinforced by the electro-osmotic conveyance of hydrogen-water compounds, e.g., hydronium ions H ($H_2O$), which convey water from the anode to the cathode.

Local desiccation of the MEA results in lower proton conductivity and thus in a reduction in the cell voltage and the efficiency of the fuel cell. In addition, due to the increasing amount of water produced in the remaining portion of the cathode channel, the dew point and the water vapor partial pressure of the cathode gas normally increase. As a consequence of the water vapor partial pressure increase, the oxygen partial pressure decreases along the cathode channel which also results in a reduction of the cell voltage and thus in a reduction of the efficiency.

U.S. Pat. No. 4,769,297 describes a fuel cell stack having porous electrodes and hydrophilic, porous distribution plates. The distribution plates absorb the water, produced on the cathode side during the electrochemical reaction, and convey it from the cathode side of the distribution plate to the anode side of an adjacent fuel cell, thus humidifying the MEA of the adjacent fuel cell. Simultaneously, the distribution plate conveys the water produced to the inlet of the cathode gas channel, thereby additionally humidifying the cathode gas.

The high manufacturing costs, as well as the increased plate thickness, are disadvantages of the hydrophilic, porous distribution plates. Further disadvantages are the high sensitivity of the distribution plates with regard to high cell temperatures, as well as the decrease in efficiency due to the additional oxygen conveyance, made possible by the porous distribution plate between adjacent fuel cells.

For regulating the humidity of the cathode gas, U.S. Pat. No. 4,973,530 proposes a fuel cell stack which uses a further medium, e.g., water, for regulating the humidity of the cathode gas, thus having an additional separate fluid circuit. The distribution plates of adjacent fuel cells have two adjacent flow-connected channel sections. In the first channel section, the cathode gas is guided onto the MEA. After flowing through the first channel section, the cathode gas flows into the second channel section and is guided there to a water-permeable membrane. On the other side of this water-permeable membrane, water is guided along, so that the cathode gas may be humidified in this second channel section. In a further embodiment, U.S. Pat. No. 4,973,530 also describes the simultaneous regulation of the humidity of the anode gas. A disadvantage is the fact that at least one additional medium and thus an additional fluid circuit are required in this system. This results in further disadvantages with regard to a compact design of the fuel cell stack. Compared to conventional fuel cell stacks, this concept also has disadvantages with regard to the reduced efficiency due to a reduced surface of the MEA.

SUMMARY OF THE INVENTION

An object of the present invention is to create a fuel cell stack which makes it possible to prevent desiccation of the MEA at the inlet of the gas channels without using an additional medium, as well as without porous and hydrophilic distribution plates.

The present invention provides a fuel cell stack for gaseous fuel, that includes at least one membrane electrode unit and at least one distribution plate. The distribution plate includes a channel area having a plurality of gas channels configured to distribute a gas to the membrane electrode unit, a supply port area configured to supply the gas to the channel area, and a plurality of connecting channels connected along the gas channels for discharging into the gas channels a locally metered quantity of unused gas from the supply port area.

In the fuel cell stack according to the present invention, in particular a PEM fuel cell stack in low-pressure operation, connecting channels discharge from the port areas into the gas channels along the gas channels in the channel section of the distribution plate. Connecting channels are provided between the gas channels for distributing the gas and the port area for supplying the gas. The measure according to the present invention may be implemented for the cathode gas on the cathode side, as well as for the anode gas on the anode side.

Using the connecting channels according to the present invention, fresh, unused gas is locally metered from the port areas into the gas channels. In particular, e.g., air may be locally metered into the cathode gas channel and, e.g., hydrogen may be locally metered into the anode gas channel. The metered gas may be unhumidified or partially humidified. Using the connecting channels according to the present invention prevents desiccation of the MEA at the inlet of the gas channels and at the location of metering without requiring an additional medium for humidifying the MEA. Reduction in proton conductivity of the MEA is thus prevented.

One advantage of the connecting channels according to the present invention is the fact that fresh, unused gas may be repeatedly metered over the entire length of the gas channels so that a gas mixture of partially used, humid gas and fresh, unused, unhumidified or partially humidified gas is created. This prevents the formation of fluid water in the anode or cathode gas channel. In addition, losses through diffusion overpotentials, which arise due to the formation of fluid water, are avoided.

Due to the addition of oxygen-containing gas, e.g., air, the oxygen partial pressure increases in the cathode gas channel, while the water vapor partial pressure decreases. The local humidity, forming in the gas mixture in the cathode gas channel, is sufficient to establish a water vapor partial pressure and a dew point in such a way that local desiccation of the MEA at the location of metering is prevented. An optimum water vapor and oxygen partial pressure of the cathode gas is achieved over the entire length of the cathode gas channel, so that high efficiency of the fuel cell and high cell voltage may be achieved.

In the same way, due to the addition of fuel-containing gas, e.g., hydrogen, the hydrogen partial pressure increases in the anode gas channel, while the water vapor partial pressure decreases. This results in an increase in the dew point, thus preventing condensation effects in the anode gas channel. An optimum hydrogen and water vapor partial pressure of the anode gas is achieved over the entire length of the anode gas channel. An increase in the cell voltage of the fuel cell results.

Due to local metering of fresh, unused gas, the dew point of the gases in the gas channels of the fuel cell stack according to the present invention is kept at a level which prevents condensation. This ensures that no fluid formation, and thus no blocking, takes place in the gas channels which would result in decreased efficiency of the fuel cell.

In contrast to the related art in U.S. Pat. No. 4,973,530 mentioned in the introduction of the description, it is an additional advantage that the MEA covers the entire channel area of the distribution plate. Anode gas and cathode gas thus contact the MEA over the entire channel length. This results in additional advantages for the cell voltage and the efficiency of the fuel cell. Moreover, a small air volume flow may be metered to the cathode gas channel without the MEA being dried out in the cathode inlet area by the unhumidified or partially humidified air. At small volume flows, the water retention capability of the MEA is sufficient to prevent desiccation of the MEA.

In addition, metering of fresh, unused gas via the connecting channels is independent from the prevailing cell temperature. This results in the advantage that the connecting channels locally meter a sufficient amount of fresh, unused gas into the gas channels over the entire performance range of the fuel cell stack so that desiccation of the MEA is prevented.

In an advantageous embodiment of the present invention, the flow cross-section of the connecting channels is smaller than the flow cross-section of the gas channels. The volume flow of the fresh, unused gas is thus metered such that the prevailing local humidity in the gas channel is sufficient to establish a sufficient water vapor partial pressure in the gas channel in order to ensure that the MEA does not dry out at the location of the gas addition. Using the connecting channels makes it possible to set an optimal stoichiometry between water vapor and fuel on the anode side and an optimal stoichiometry between water vapor and oxygen on the cathode side.

The gas channels between the two port areas for supplying and removing the anode gas and the cathode gas may run serpentine-shaped, for example, adjacent gas channels being physically separated by webs. These webs have openings, e.g., recesses, in an advantageous embodiment of the present invention. These openings make controlled cross flows between adjacent gas channels possible. This results in further advantages with regard to the increase of the dew point of the anode gas and the cathode gas.

In order to achieve a homogeneous flow in the gas channels, a pressure difference between the port areas of the supply and removal of the gases may be present in an advantageous embodiment of the present invention. Here, the pressure in the port area for gas supply is higher than the pressure in the port area for gas removal.

BRIEF DESCRIPTION OF THE DRAWINGS

The present invention is explained in greater detail in the following, based upon the drawings.

DETAILED DESCRIPTION

Figure 1:
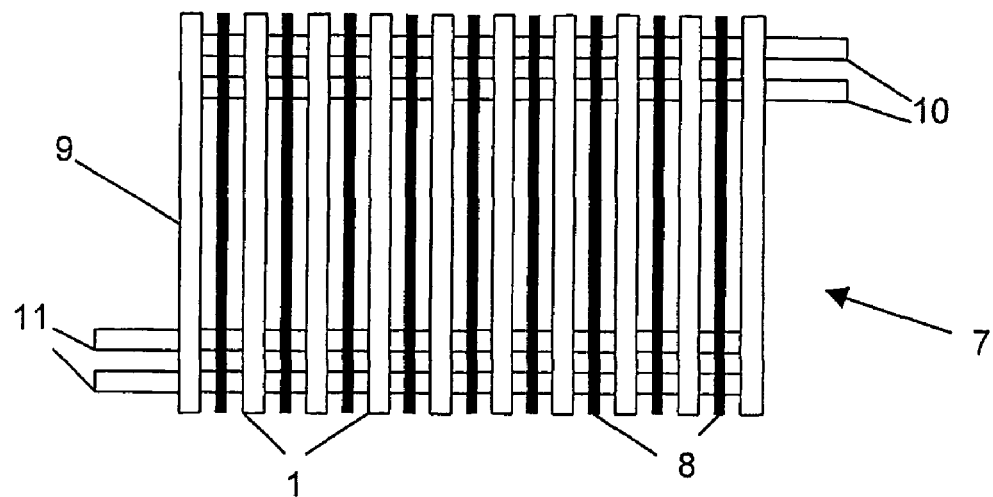
FIG. 1 shows a side view of a fuel cell stack according to the present invention having MEAs and distribution plates arranged in a stack.

In an exploded view, FIG. 1 shows a fuel cell stack 7 according to the present invention having membrane electrode units 8 and distribution plates 1 arranged in a stack. A membrane electrode unit 8 is situated between two adjacent distribution plates 1. Fuel cell stack 7 is delimited by end plates 9 and has lines 10 for supply and removal of the anode gas and lines 11 for supply and removal of the cathode gas. Membrane electrode unit 8 covers the entire channel area (not shown) of distribution plate 1.

Figure 2:
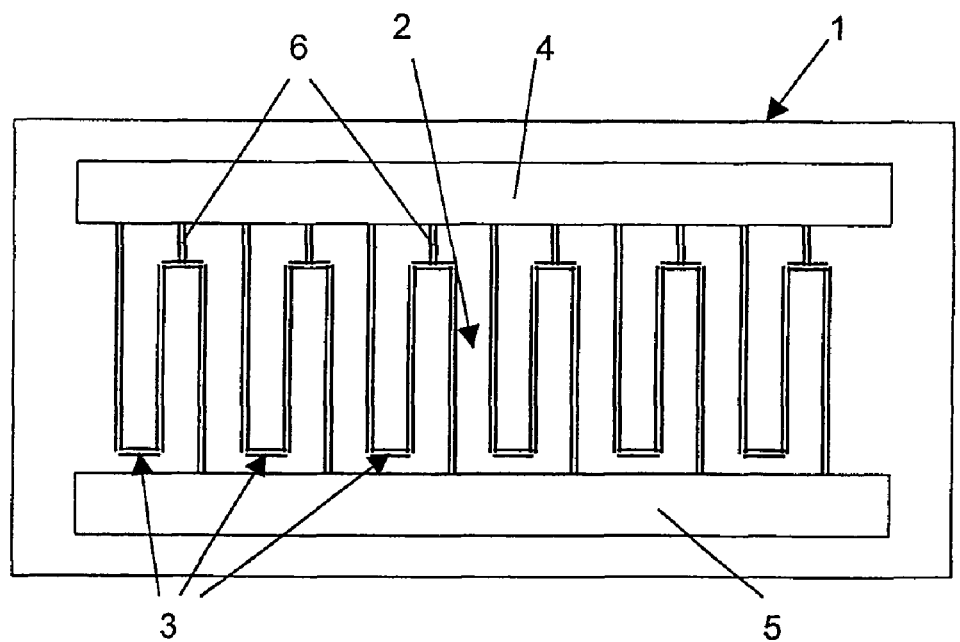
FIG. 2 shows a first embodiment of a distribution plate of the fuel cell stack according to the present invention having connecting channels between the gas channels and the port area for the gas supply.

A first embodiment of a distribution plate 1 according to the present invention is illustrated in FIG. 2. Distribution plate 1 has a channel area 2 including several parallel gas channels 3. Gas channels 3 run from a port area 4 for the gas supply to a port area 5 for the gas removal. Gas channels 3 are serpentine-shaped in the embodiment shown. However, it is also possible that instead of several gas channels 3, one continuous, serpentine-shaped gas channel 3 runs from port area 4 for the gas supply to port area 5 for the gas removal. Connecting channels 6 run between port area 4 for the gas supply and gas channels 3 in channel area 2. These connecting channels make local metering of fresh, unused gas from port area 4 for the gas supply into gas channels 3 possible.

Figure 3:
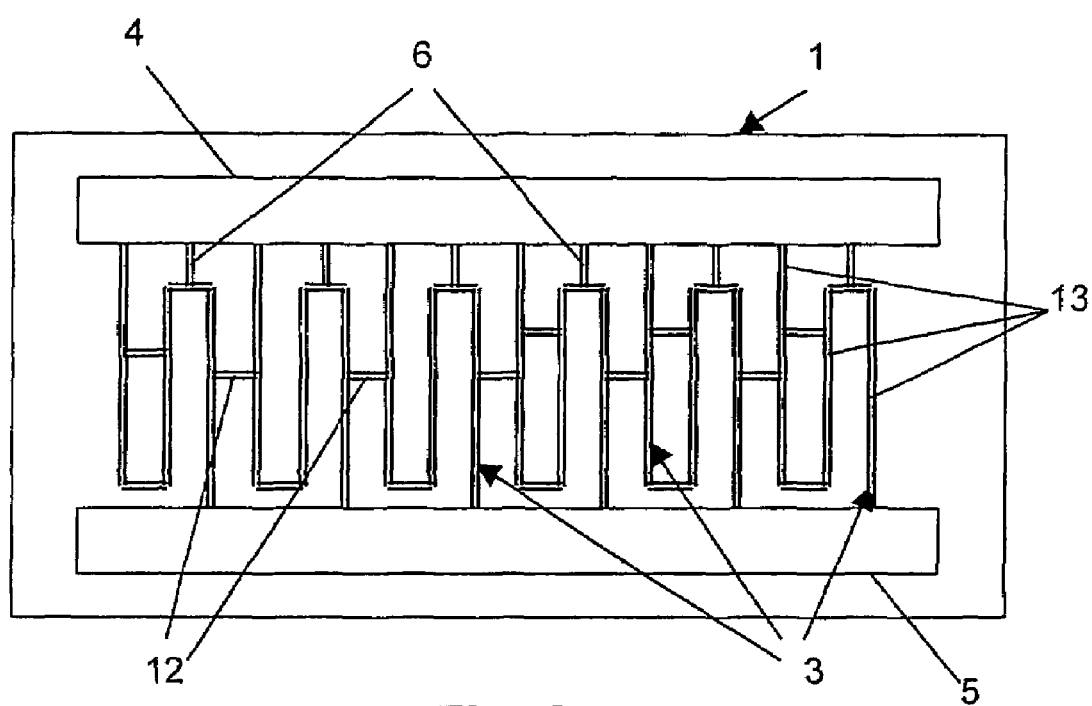
FIG. 3 shows a second embodiment of a distribution plate of the fuel cell stack according to the present invention having connecting channels between the gas channels and the port area for the gas supply, as well as connecting channels between adjacent gas channel sections.

FIG. 3 shows a second embodiment of a distribution plate 1 according to the present invention. In addition to the embodiment shown in FIG. 2, webs (not depicted) are present between adjacent, parallel gas channel sections 13, as well as between adjacent, parallel gas channels 3. These webs have openings 12, e.g., channels, so that adjacent gas channel sections 13 are connected. It is also possible that adjacent gas channels 3 are connected with one another. This results in a cross flow between adjacent gas channel sections 13 and between adjacent gas channels 3. Gas channels 3, shown in this embodiment, have a serpentine shape. However, it is also possible that instead of several serpentine-shaped gas channels 3, one continuous, serpentine-shaped gas channel 3 runs from port area 4 of the gas supply to port area 5 of the gas removal.

What is claimed is:

1. A fuel cell stack for gaseous fuel, comprising:
   a membrane electrode unit; and
   at least one distribution plate including:
      a channel area having a plurality of gas channels configured to distribute a gas to the membrane electrode unit;

a supply port area configured to supply the gas to the channel area; and a plurality of connecting channels connected along the gas channels for discharging into the gas channels a locally metered quantity of unused gas from the supply port area, wherein the connecting channels have a flow cross-section that is smaller than a flow cross-section of the plurality of gas channels.

* * * * *

UNITED STATES PATENT AND TRADEMARK OFFICE
CERTIFICATE OF CORRECTION

PATENT NO. : 7,335,437 B2 Page 1 of 1
APPLICATION NO. : 10/415786
DATED : September 15, 2003
INVENTOR(S) : Blank et al.

It is certified that error appears in the above-identified patent and that said Letters Patent is hereby corrected as shown below:

On the title page:
(75) Inventors: Felix Blank, Constance (DE); Cosmas Heller, Friedrichshafen (DE); Ottmar Schmid, Markdorf, (DE)

should read

(75) Inventors: Felix Blank, Konstanz (DE); Cosmas Heller, Friedrichshafen (DE); Ottmar Schmid, Markdorf, (DE)

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,335,437 B2  
APPLICATION NO. : 10/415786  
DATED : February 26, 2008  
INVENTOR(S) : Blank et al.

Page 1 of 1

It is certified that error appears in the above-identified patent and that said Letters Patent is hereby corrected as shown below:

On the title page:
(75) Inventors: Felix Blank, Constance (DE); Cosmas Heller, Friedrichshafen (DE); Ottmar Schmid, Markdorf, (DE)

should read

(75) Inventors: Felix Blank, Konstanz (DE); Cosmas Heller, Friedrichshafen (DE); Ottmar Schmid, Markdorf, (DE)

This certificate supersedes the Certificate of Correction issued June 17, 2008.

Signed and Sealed this

Twenty-second Day of July, 2008

JON W. DUDAS  
*Director of the United States Patent and Trademark Office*